US011267683B2

(12) United States Patent
Hovendahl et al.

(10) Patent No.: US 11,267,683 B2
(45) Date of Patent: Mar. 8, 2022

(54) CAPPING AND DE-CAPPING APPARATUS AND A METHOD OF OPERATING SUCH AN APPARATUS

(71) Applicant: Brooks Automation, Inc., Chelmsford, MA (US)

(72) Inventors: Lars Weber Hovendahl, Hvalso (DK); Michael Nielsen, Lejre (DK); Stig Christensen, Greve (DK)

(73) Assignee: BROOKS AUTOMATION, INC., Chelmsford, MA (US)

( * ) Notice: Subject to any disclaimer, the term of this patent is extended or adjusted under 35 U.S.C. 154(b) by 216 days.

(21) Appl. No.: 16/483,294

(22) PCT Filed: Feb. 5, 2018

(86) PCT No.: PCT/IB2018/050705
§ 371 (c)(1),
(2) Date: Aug. 2, 2019

(87) PCT Pub. No.: WO2018/142361
PCT Pub. Date: Aug. 9, 2018

(65) Prior Publication Data
US 2019/0375619 A1 Dec. 12, 2019

(30) Foreign Application Priority Data
Feb. 3, 2017 (DK) .............................. PA201770063

(51) Int. Cl.
*B67B 3/20* (2006.01)
*B67B 7/18* (2006.01)
*G01N 35/00* (2006.01)
(52) U.S. Cl.
CPC ............ *B67B 3/2066* (2013.01); *B67B 7/182* (2013.01); *G01N 35/0099* (2013.01)

(58) Field of Classification Search
CPC ....... B67B 3/20; B67B 3/2066; B67B 3/2073; B67B 3/268; B67B 7/18
(Continued)

(56) References Cited

U.S. PATENT DOCUMENTS 4,519,276 A 5/1985 Grabarski et al.
9,199,755 B1 * 12/2015 Cohen .................. A47B 81/007
(Continued)

FOREIGN PATENT DOCUMENTS

EP 1424307 A1 6/2004
EP 1882949 A1 1/2008
(Continued)

OTHER PUBLICATIONS

Christensen et al., "Test Tube Capping And De-Capping Apparatus", U.S. Appl. No. 16/286,118, filed Feb. 26, 2019.
(Continued)

*Primary Examiner* — Valentin Neacsu
*Assistant Examiner* — Jacob A Smith
(74) *Attorney, Agent, or Firm* — Hamilton, Brook, Smith & Reynolds, P.C.

(57) ABSTRACT

A capping and de-capping apparatus (100) for capping and de-capping tubes (112) disposed in a tube holding rack (111) having a two-dimensional array of apertures (114) for holding the tubes (112). The apparatus (100) comprises a rack support (110) for supporting the tube holding rack (111), a head unit (120) adapted for carrying a cartridge (152) comprising at least one capping and de-capping gripper (122), a drive system (130) for moving the rack support (110) and the head unit (120) relatively towards and away from one another, in order to cause engagement or disengagement of the capping and de-capping gripper (122) with or from a cap (113) of at least one tube (112), and a drive system (140) for rotating the capping and de-capping gripper
(Continued)

(122), wherein rotation in one direction causes attachment of the cap (113) to the tube (112) and rotation in the opposite direction causes detachment of the cap (113) from said tube (112).

19 Claims, 5 Drawing Sheets

(58) Field of Classification Search
USPC ....... 53/287, 318, 329, 381.4, 485, 490, 492
See application file for complete search history.

(56) References Cited

U.S. PATENT DOCUMENTS

| 10,214,404 | B2 | 2/2019 | Christensen et al. | |
|---|---|---|---|---|
| 2007/0095024 | A1* | 5/2007 | Neeper | B65B 7/2821 |
| | | | | 53/485 |
| 2007/0107554 | A1* | 5/2007 | Yeager | B67B 7/18 |
| | | | | 81/3.33 |
| 2014/0311090 | A1* | 10/2014 | Weber | B25J 15/12 |
| | | | | 53/381.4 |
| 2015/0175398 | A1* | 6/2015 | Christensen | B67B 7/182 |
| | | | | 53/490 |
| 2017/0113909 | A1* | 4/2017 | Frey | B01L 3/50825 |

FOREIGN PATENT DOCUMENTS

| EP | 2385015 | A1 | 11/2011 | |
|---|---|---|---|---|
| GB | 2010789 | A * | 7/1979 | ............. B67B 7/182 |
| GB | 2010789 | A * | 7/1979 | ............. B67B 7/182 |
| GB | 2010789 | A | 7/1979 | |
| JP | 58129365 | A | 8/1983 | |
| JP | 2005345177 | A | 12/2005 | |
| JP | 2010100312 | A | 5/2010 | |
| WO | 2003034038 | A2 | 4/2003 | |
| WO | 2014023683 | A2 | 2/2014 | |
| WO | 2014023683 | A3 | 2/2014 | |
| WO | WO2014023683 | A2 * | 2/2014 | ............... B67B 3/20 |

OTHER PUBLICATIONS

International Search Report and the Written Opinion for International Application No. PCT/IB2018/050705, "A Capping And De-Capping Apparatus And A Method Of Operating Such An Apparatus" dated May 11, 2018.
International Preliminary Report on Patentability or International Application No. PCT/IB2018/050705, "A Capping and De-Capping Apparatus and a Method of Operating Such an Apparatus," dated Aug. 6, 2019.

* cited by examiner

CAPPING AND DE-CAPPING APPARATUS AND A METHOD OF OPERATING SUCH AN APPARATUS

RELATED APPLICATIONS

This application is the U.S. National Stage of International Application No. PCT/IB2018/050705, filed Feb. 5, 2018, which designates the U.S., published in English, and claims priority under 35 U.S.C. § 119 or 365(c) to DK Application No. PA201770063, filed Feb. 3, 2017. The entire teachings of the above applications are incorporated herein by reference.

TECHNICAL FIELD

The disclosure relates to an apparatus for capping and de-capping tubes and also a method of using such an apparatus.

BACKGROUND

High value biological samples are often stored and processed using so-called SBS format racks containing a plurality of test tubes. Such racks may contain, for example, 96 test tubes in an array of 8 by 12 apertures designed to hold the tubes securely. The test tubes and their contents may be maneuvered in a processing system, for example between a cold store and various processing stations and may be required to be filled (partly or fully) or processed simultaneously or individually.

Conventionally, capping and de-capping has either been carried out by hand or else by means of a capping and de-capping unit one test tube at a time, either while they are still held in the rack or after they have been separated from the rack. This is not only tedious (particularly in the case of manual capping and de-capping), but also slow as it is usual for multiple tubes to require processing in the same way at the same time. It is known to provide a linear array of capping and de-capping units to allow for the capping and de-capping of a row of tubes, but such systems have been bulky as a result of the dimensions of the drive systems for the capping and de-capping units, the close spacing of the test tubes requiring the drive systems of the capping and de-capping units to be remote from the capping and de-capping heads and disposed over a larger footprint than the rack because of their size.

EP 1882949 discloses a capping and de-capping apparatus having a test tube rack support for supporting a rack containing a plurality of capped test tubes in a given position. A head unit supports a two-dimensional array of capping and de-capping spindles, each of which includes a clutch and a capping and de-capping spigot or socket, the spindles being aligned with the test tube positions defined in the rack. A drive system moves the tubes and the head unit relatively towards and away from one another in use, when a rack containing capped test tubes is disposed in the rack support, causing engagement and disengagement of the spigots or sockets with and from the tube caps. A spindle drive system provides simultaneous rotation of the spigots or sockets together after engagement with tube caps, either to attach caps to the tubes or detach caps from the tubes. Ejection of the caps from the spigots is caused by moving an external net in the opposite direction to the spindle translational movement thereby detaching all sockets from all caps in one movement.

EP 13752860 discloses an apparatus for capping and de-capping test tubes having one or more capping and de-capping grippers equipped with a capping and de-capping socket unit wherein the one or more grippers each are configured with an ejector pin moveably arranged within one or more grippers, and wherein the ejector pin may perform a translational movement relative to the gripper effecting the release from the socket unit of a cap retained by the socket unit.

SUMMARY

It is an object to provide a capping and de-capping apparatus having an exchangeable gripper cartridge which will permit simple and quick exchange of an entire array of capping and de-capping grippers at once instance.

The foregoing and other objects are achieved by the features of the independent claims. Further implementation forms are apparent from the dependent claims, the description, and the figures.

According to a first aspect, there is provided a capping and de-capping apparatus for capping and de-capping tubes disposed in a tube holding rack having a two-dimensional array of apertures for holding the tubes, the apparatus comprising a rack support for supporting the tube holding rack, a head unit adapted for carrying a cartridge comprising at least one capping and de-capping gripper, a drive system for moving the rack support and the head unit relatively towards and away from one another, in order to cause engagement or disengagement of the capping and de-capping gripper with or from a cap of at least one tube, and a drive system for rotating the capping and de-capping gripper, wherein rotation in one direction causes attachment of the cap to the tube and rotation in the opposite direction causes detachment of the cap from the tube.

Different types of tube caps require different types of grippers, wherefore the grippers of an apparatus for capping and de-capping tubes may need exchanging on a regular basis. An apparatus according to the second aspect facilitates simple and highly efficient exchange of grippers, since it is no longer needed to change the grippers one by one, instead all of the grippers are changed simultaneously when changing cartridge. Hence, the apparatus can be used far more efficiently due to a significant reduction in downtime when changing between different grippers.

In a first possible implementation form of the first aspect, the head unit comprises a first attachment body and a second attachment body, the cartridge being attached to the second attachment body, facilitating stable connection of the cartridge to the head unit and therefore giving the cartridge as a reliable movement trajectory.

In a second possible implementation form of the first aspect, the cartridge is attached to and detached from the second attachment body by means of automated clamping means arranged on the second attachment body, facilitating use of the apparatus in an automated environment.

In a third possible implementation form of the first aspect, the apparatus comprises at least one apparatus setup means.

In a fourth possible implementation form of the first aspect, the apparatus setup means comprises a combination of switches arranged on the head unit.

In a fifth possible implementation form of the first aspect, the apparatus setup means comprises a microchip arranged on the cartridge.

In a sixth possible implementation form of the first aspect, the capping and de-capping gripper has a through going passage extending along a center axis of the capping and de-capping gripper, and wherein an ejector pin is moveably arranged within the through going passage, the ejector pin being configured to perform a translational movement relative to the capping and de-capping gripper, thereby effecting a release of a cap retained within the capping and de-capping gripper.

In a seventh possible implementation form of the first aspect, the ejector pin is attached to the first attachment body.

In an eight possible implementation form of the first aspect, the apparatus comprises a plurality of capping and de-capping grippers so configured that each capping and de-capping gripper may engage and/or disengage a cap independently of the other grippers, making the apparatus highly flexible and versatile.

In a ninth possible implementation form of the first aspect, the apparatus comprises a control unit configured to control the operation of the capping and de-capping grippers and/or the ejector pins independently from one another.

In a tenth possible implementation form of the first aspect, the apparatus comprises a user interface associated with the control unit and configured to permit a user to decide which capping and de-capping gripper shall engage and/or disengage a tube configured to receive and/or dispose of a cap placed within the rack.

According to a second aspect, there is provided a method of operating a capping and de-capping apparatus according to the above, the method comprising the steps of placing a cartridge onto a rack support, moving a head unit towards the cartridge and rack support by means of a drive system, attaching the cartridge to the head unit, moving the head unit and cartridge from the rack support by means of the drive system, placing a rack onto the rack support, moving the head unit and cartridge towards the rack and rack support by means of the drive system, at least one capping and de-capping gripper, attached to the cartridge, engaging an opposing cap on an opposing test tube placed in a rack on the rack support, and disengaging the cap from the test tube by means of concerted movement of the drive system, moving the head unit away from the rack support, and a simultaneous rotational movement of the gripper unit, the rotational movement being caused by an actuator unit connected to the capping and de-capping gripper, attaching a cap, by means of reversing the above steps, the rotational movement being stopped when a means for sensing a torque registers that a certain threshold torque is exceeded.

As previously mentioned, different types of tube caps require different types of grippers, wherefore the grippers of an apparatus for capping and de-capping tubes may need exchanging on a regular basis. A method according to the third aspect facilitates simple and highly efficient exchange of grippers, since it is no longer needed to change the grippers one by one, instead all of the grippers are changed simultaneously when changing cartridge. Hence, the apparatus can be used far more efficiently due to a significant reduction in downtime when changing between different grippers.

In a first possible implementation form of the second aspect, the method further comprises the step of activating apparatus setup means, thereby effecting an apparatus setup tailored to the specific capping and de-capping grippers of the cartridge.

In a second possible implementation form of the second aspect, the activating comprises the cartridge interacting with a combination of switches arranged on the head unit.

In a third possible implementation form of the second aspect, the activating comprises a microchip arranged on the cartridge interacting with a control unit of the apparatus.

In a fourth possible implementation form of the second aspect, the method further comprises detaching the cartridge from the head unit by means of the steps of moving the head unit and cartridge towards the rack support by means of a drive system such that the cartridge rests upon the rack support, detaching the cartridge from the head unit, moving the head unit from the cartridge and the rack support by means of the drive system.

In a fifth possible implementation form of the second aspect, the cartridge is attached to and detached from the head unit by means of automated clamping means.

In a sixth possible implementation form of the second aspect, the caps in contact with a capping and de-capping gripper, but not undergoing a rotation by the actuator unit forming part of such a capping and de-capping gripper, are not removed from their respective test tubes.

In a seventh possible implementation form of the second aspect, the method comprises the steps of releasing a capped tube from a capping and de-capping gripper by moving a first attachment body towards the rack support such that an ejector pin comes into contact with the cap of the tube, disengaging the socket unit from the cap by moving a second attachment body away from the tube, whereby the ejector pin remains in contact with the cap while the socket unit is disengaged from the cap, moving the first attachment body from the rack support, thereby releasing the tube and freeing the capping and de-capping apparatus to perform a new cycle of capping and de-capping.

In an eight possible implementation form of the second aspect the first and second attachment bodies are moved by means of a drive system, the use of one drive system being a cost and space efficient solution.

These and other aspects will be apparent from the embodiments described below.

BRIEF DESCRIPTION OF THE DRAWINGS

In the following detailed portion of the present disclosure, the aspects, embodiments, and implementations will be explained in more detail with reference to the example embodiments shown in the drawings, in which.

DETAILED DESCRIPTION

Figure 1:
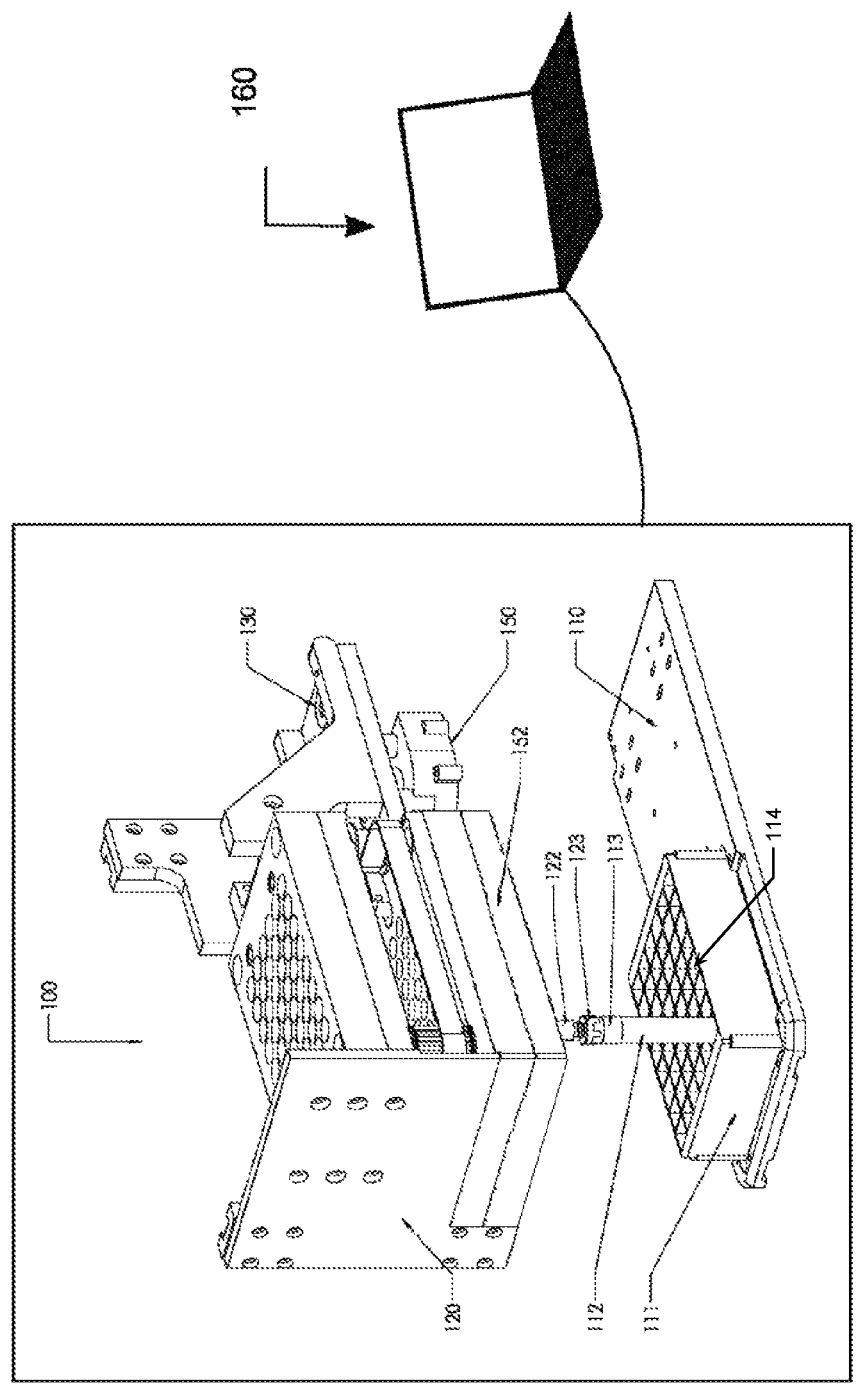
FIG. 1 shows a schematical perspective view of a capping and de-capping apparatus in accordance with an embodiment of the present invention. The combination of the apparatus according to the present invention with an external control unit is exemplarily shown without this embodiment being thereby considered preferred.
Figure 2:
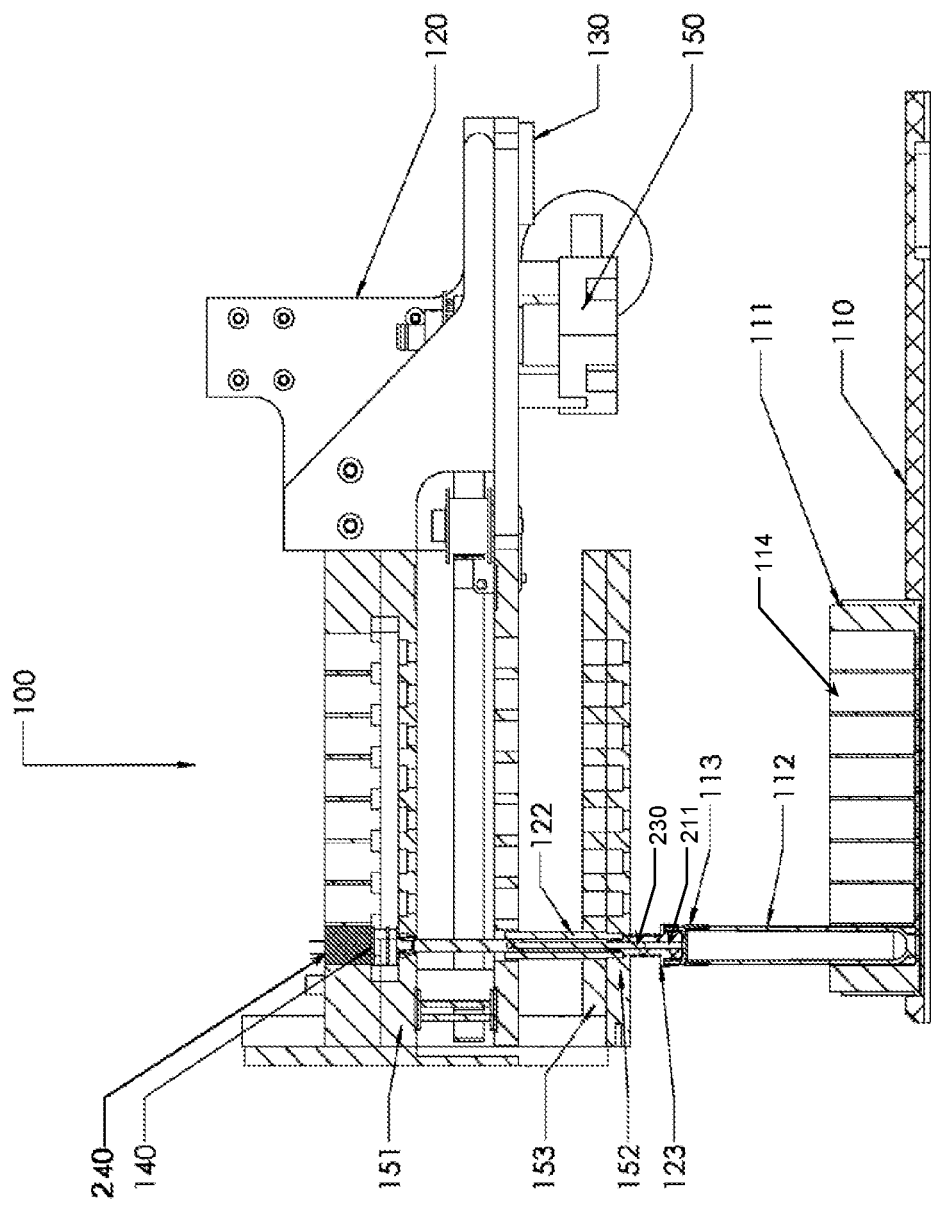
FIG. 2 shows a sectional side view of the embodiment shown in FIG. 1.

An embodiment of the capping and de-capping apparatus 100 according to the invention is depicted in detail in FIGS. 1 and 2. In FIG. 1, an external control unit 160 is shown for illustrative purposes. As is clear to the skilled person, the control unit 160 can be external to the apparatus 100 for some purposes or can be integrated into the apparatus for other purposes. Further, the connection between the control unit 160 and the apparatus 100 may be a cable as shown in the figure or could be a WIFI-signal or other like options depending on the skilled person's choice, such choices being considered trivial in a modern laboratory setting.

The capping and de-capping apparatus 100 is equipped with a rack support 110 for supporting a tube rack 111, preferably a test tube rack, for containing in given position within the rack 111 at least one tube 112, preferably a test tube, fitted to receive and/or dispose of a cap 113, preferably a screw cap.

The capping and de-capping apparatus 100 is further equipped with a head unit 120 comprising first and second attachment bodies 151, 153. The first attachment body 151 supports i.a. ejector pins 230. The second attachment body 153 supports a cartridge 152 provided with a two-dimensional array 121 (in the present exemplary embodiment a 6×8 array, however, any suitable array is possible, e.g. 8×12) of capping and de-capping grippers 122. Each capping and de-capping gripper 122 includes a capping and de-capping socket unit 123 capable of engaging and retaining a cap, and the capping and de-capping grippers 122 are aligned with the tube positions within the rack 111.

The first and second attachment bodies 151, 153, the cartridge 152, the tube rack 111, and the rack support 110 all extend essentially in parallel with each other. Preferably, the plane of each of these components extends horizontally, when the apparatus is placed on a work surface such as a table, the rack support 110 being the closest to the table and the first attachment body 151 being the farthest, when seen in the vertical direction.

The capping and de-capping apparatus 100 is also equipped with a drive system 130 for moving the rack support 110 and head unit 120 relatively towards and away from one another in use, when a rack 111 containing tube 112 is disposed in the rack support 110, to cause engagement and disengagement of the capping and de-capping socket unit 123 with and from the tube 112.

The capping and de-capping apparatus 100 is further equipped with a drive system 140 for rotating the capping and de-capping grippers 122, and the capping and de-capping socket units 123 attached thereto. The rotation of the capping and de-capping socket unit 123, after engagement of the capping and de-capping socket unit 123 with the cap 113, can cause either attachment of the cap 113 to the tube 112 within the rack 111 when the capping and de-capping gripper 122 rotate in the one direction or detachment of the cap 113 from the tube 112 when the at least capping and de-capping gripper 122 rotates in the other direction.

Further, the capping and de-capping apparatus 100 is equipped with a drive system 150 internal to the head unit 120, permitting the first attachment body 151 and the second attachment body 152 to perform a movement towards and away from each other independently of the movement of the head unit 120 when moved by the drive system 150.

Finally, the capping and de-capping apparatus 100 is further equipped with a control unit 160, the control unit being preferably a programmable logic controller, a microprocessor, or a computer application, the control unit 160 being either internal or external to the apparatus 100, for controlling the movement, both translational and rotational, of the gripper units and ejector pins individually, in subgroups of the total array of gripper units and ejector pins, or the totality of the gripper units and ejector pins and by providing a user interface permitting the user to select which gripper or grippers within the array of grippers that shall engage a corresponding tube within the rack. In a preferred embodiment the control unit 160 is equipped with means for measuring the torque associated with each rotating gripper, preferably by measuring the current supplied to the drive system 140 needed to effectuate a continued rotation of the gripper, and means for terminating the rotation of the at least one gripper if a given threshold value is exceeded.

Figure 3:
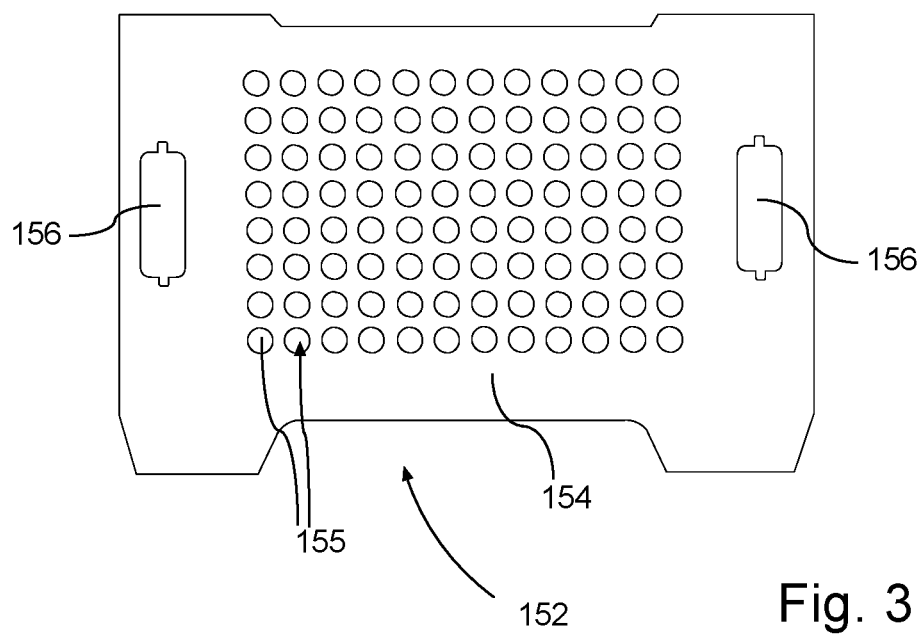
FIG. 3 is a top view of a cartridge according to a further embodiment of the present invention.
Figure 4:
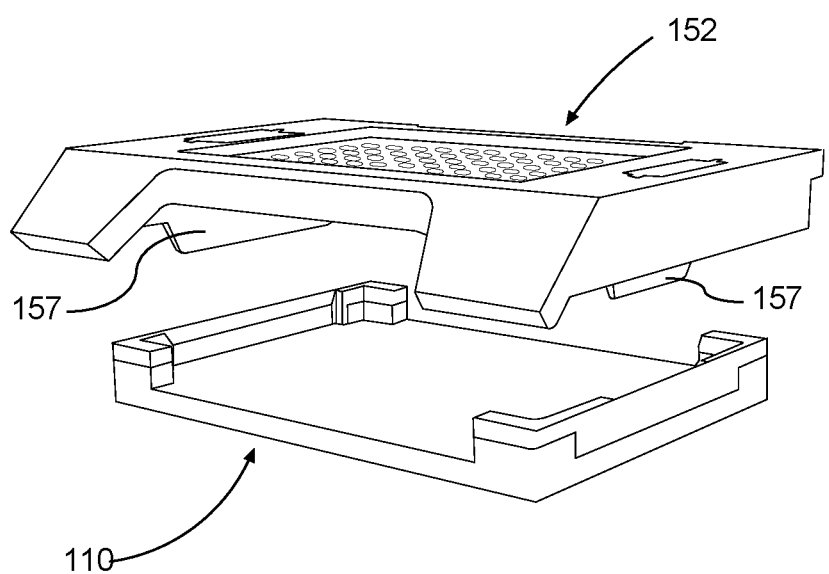
FIG. 4 is a perspective view of a cartridge according to the embodiment shown in FIG. 3, as well as a rack support.

The above mentioned cartridge, shown in FIGS. 3 and 4, comprises an essentially rectangular tray 154 which is provided with a two-dimensional array of through going holes 155, and each through going hole 155 is adapted for receiving a capping and de-capping gripper 122. Two opposing edges of the tray 154, the front and the back edges, may be provided with centred recesses making the depth of the cartridge smaller at the centre section than at the edge sections. By front is meant the edge which faces the user when the cartridge is arranged in the apparatus. The two remaining opposing edges of the tray, the side edges, are provided with first engagement means 156 adapted for attaching the cartridge 152 to the second attachment body 153 of the apparatus 100. The first engagement means 156 preferably comprise of through going recesses, and the head unit 120 is correspondingly provided with engagement means, such as automated clamping means arranged on the second attachment body 153 which interact with these recesses 156 such that the cartridge 152 can be locked to the second attachment body 153. The cartridge is locked to the second attachment body 153 such that each capping and de-capping gripper 122 is aligned with a tube aperture 114 provided in a tube holding rack 111 inserted into the apparatus 100. This allows the capping and de-capping gripper 122 to engage and/or disengage with a cap 113 of at least one tube 112 placed in the tube holding rack 111.

The tray 154 further comprises second engagement means 157 arranged along the opposing tray edges. The second engagement means 157 are preferably in the shape of elongate protrusions adapted for engaging with corresponding means, such as elongate recesses, provided in a rack support 110 supporting the tube holding rack 111. See FIG. 4.

The apparatus 100 further comprises at least one apparatus setup means, which may comprise either of a combination of switches arranged on the head unit 120 or a microchip arranged on the cartridge 152. Activation of the apparatus setup means effects an apparatus setup which is tailored to the specific capping and de-capping grippers 122 of the cartridge 152. The combination of switches interact with the cartridge when the cartridge is attached to the head unit 120. An embodiment comprising a microchip interacts with the control unit 160. The apparatus setup means may comprise data informing the apparatus of which setup is needed for a certain test tube, i.e. a certain capping and de-capping gripper 122, the data relating to torque, speed, pitch on the tread, etc.

The capping and de-capping grippers 122 are attached to the cartridge 152, preferably in an easily releasable manner such as by means of a "nut and bolt" type solution. In such an embodiment, one end of the gripper 122 is provided with a threaded section, which is inserted, from one side of the cartridge 152, through a through going hole 155, and thereafter locked to the cartridge 152 by means of a nut interacting with the treaded section on the opposite side of the cartridge 152.

The nut comprises an interface for engaging with an actuator unit 240 of the head unit 120. In one embodiment, the interface comprises of a slot which extends between two opposing side sections of the nut and in the direction of the center axis of the nut, providing the nut with an essentially U-shaped cross-section.

The cartridge may comprise several different capping and de-capping grippers 122, each gripper comprising a different socket unit 123.

Further, the cartridge 152 may be provided with an identifier which identifies the type of cartridge such as, but not limited to, a bar code, an RFID tag, or mechanical indicia. Further, the identifier may comprise of a writeable electronic memory and a receiver/transmitter. In this embodiment the identifier may transmit data about the machine, the cartridge, and usage of the cartridge such as information on the number of caps and/or de-caps that the cartridge 152 has made, which machines the cartridge 152 has been in, service logs for the cartridge 152, the type of capping and de-capping grippers 122 present in the cartridge, etc.

The capping and de-capping gripper 122 comprises a capping and de-capping socket unit 123 capable of engaging and retaining a cap 113, the capping and de-capping socket unit 123 having a through going passage 211 extending along the center axis of the socket unit 123. The gripper 122 further comprises an ejector pin guide also having a through going passage 221, and an ejector pin 230. The socket unit 123 and the ejector pin guide are so arranged to permit the ejector pin 230 to perform a translational movement within the socket unit 123 and the ejector pin guide.

The ejector pin 230 is stationary with respect to the above mentioned first attachment body 151 for example because it is attached to the first attachment body 151. Likewise, the ejector pin guide is stationary with respect to the second attachment body 152, for example because it is attached to the cartridge 152. Accordingly, upon the activation of the drive system 150, the translational movement of the ejector pin 230 within the socket unit 123 and the ejector pin guide can be effectuated.

While it is possible for the capping and de-capping socket unit 123 and the ejector pin guide to be manufactured in one piece, it is preferred that they are not. Therefore, in a preferred embodiment the capping and de-capping socket 123 is attachable and detachable to the ejector pin guide such that when the capping and de-capping socket unit 123 is attached to the ejector pin guide, the ejector pin 230 may perform a translational movement within the ejector pin guide attached to the capping and de-capping socket unit 123.

The drive system 140 for rotating the ejector pins 230 comprises a plurality of actuator units 240, each actuator unit 240 comprising an actuator, preferably an electro motor, mechanically coupled to the ejector pin 230. In a preferred embodiment of the actuator unit 240, the actuator is mechanically coupled to the ejector pin 230 by means of a gear. Additionally, the drive system 140 may comprise internal or external means for sensing the torque on the ejector pin 230, e.g. if the actuator is an electro motor, by detecting a change in the current supplied to the actuator, and internal or external means for halting the actuator movement if a certain threshold torque is exceeded. Preferably, however, the means for sensing torque and the means for halting the actuator movement are associated with the control unit 160.

In this further embodiment wherein the ejector pin 230 is rotated by the actuator unit 240, the ejector pin 230 includes means for transferring the rotational movement created by the actuator unit 240 to the ejector pin guide or the capping and de-capping socket unit 123. In one embodiment the means for transferring the rotational movement of the ejector pin 230 to the ejector pin guide consists in a pin protruding from the ejector pin 230 at a right angle and into a longitudinal groove in the ejector pin guide.

In a further embodiment the ejector pin guide further comprises means for attaching a capping and de-capping socket unit 123 to the ejector pin guide. In a preferred embodiment the means for attaching a capping and de-capping socket unit 123 further comprises a biasing means, preferably a coil spring.

In another embodiment the capping and de-capping socket unit 123 is permanently attached to the ejector pin guide. It to be understood that the socket unit 123 is so conceived that the manner of which it engages and disengages a cap is independent of how it attaches to the ejector pin guide, and whether this attachment is permanent or not.

In operation, a cartridge 152 is placed onto the rack support 110, which previously has been ejected, essentially horizontally, from its original placement within the main structure of the apparatus. The cartridge 152 and rack support 110 are withdrawn back into the apparatus structure, where after the head unit 120 is moved towards the cartridge 152 and rack support 110 by means of the drive system 130. The cartridge is attached to the head unit 120, where after the head unit 120 and cartridge 152 are moved from the rack support 110 by means of the drive system 130. Subsequently, the rack support 110 is yet again ejected from the apparatus structure and the rack 111 is placed onto the rack support 110. The head unit 120 is moved towards the rack 11 and rack support 110 by the drive system 130. A capping and de-capping gripper 122 engages the opposing cap 113 on an opposing test tube 112, placed in a rack 111 on the rack support 110, via the socket unit 123. Disengagement of the cap 113 from the test tube 112 is brought about by the concerted movement of the drive system 130 moving the head unit 120 away from the rack support 110 and a rotational movement of the actuator unit 240 connected to the capping and de-capping gripper 122 in contact with the cap 113. Caps in contact with a capping and de-capping gripper 122 but not undergoing a rotation by the actuator unit 240 forming part of such a capping and de-capping gripper 122 are not removed from their respective test tubes 112.

The operation may comprise activating apparatus setup means, thereby effecting an apparatus setup which is tailored to the specific capping and de-capping grippers 122 of the cartridge 152. The activation is executed by either a combination of switches which interact with the cartridge when the cartridge is attached to the head unit 120, or a microchip which interacts with the control unit 160.

Caps 113 in contact with a capping and de-capping gripper 122, but not undergoing a rotation by the actuator unit 240 forming part of such a capping and de-capping gripper 122, are not removed from their respective test tubes 112.

In order to attach a removed cap, the above procedure is reversed. The rotational movement of the capping and de-capping gripper 122, caused by the actuator unit 240, is stopped when the means for sensing the torque on the ejector pin registers that a certain threshold torque is exceeded. The tube 112, now having a cap, has its cap released from the socket unit 123 by moving the first attachment body 151 in a direction towards the rack support 110 and tube 112 such that the ejector pin 230 comes into contact with the cap 113. Thereafter, the socket unit 123 is disengaged from the cap 113 by moving the second attachment body 153 in a direction away from the rack support 110 and tube 112. This way, the ejector pin 230 remains in contact with the cap 113 while the socket unit 123 is disengaged from the cap 113, thereby releasing the tube 112 and freeing the capping and de-capping apparatus 100 to perform a new cycle of capping and de-capping. As previously mentioned, first and second attachment bodies 151, 153 are moved by means of the drive system 150.

Figure 5:
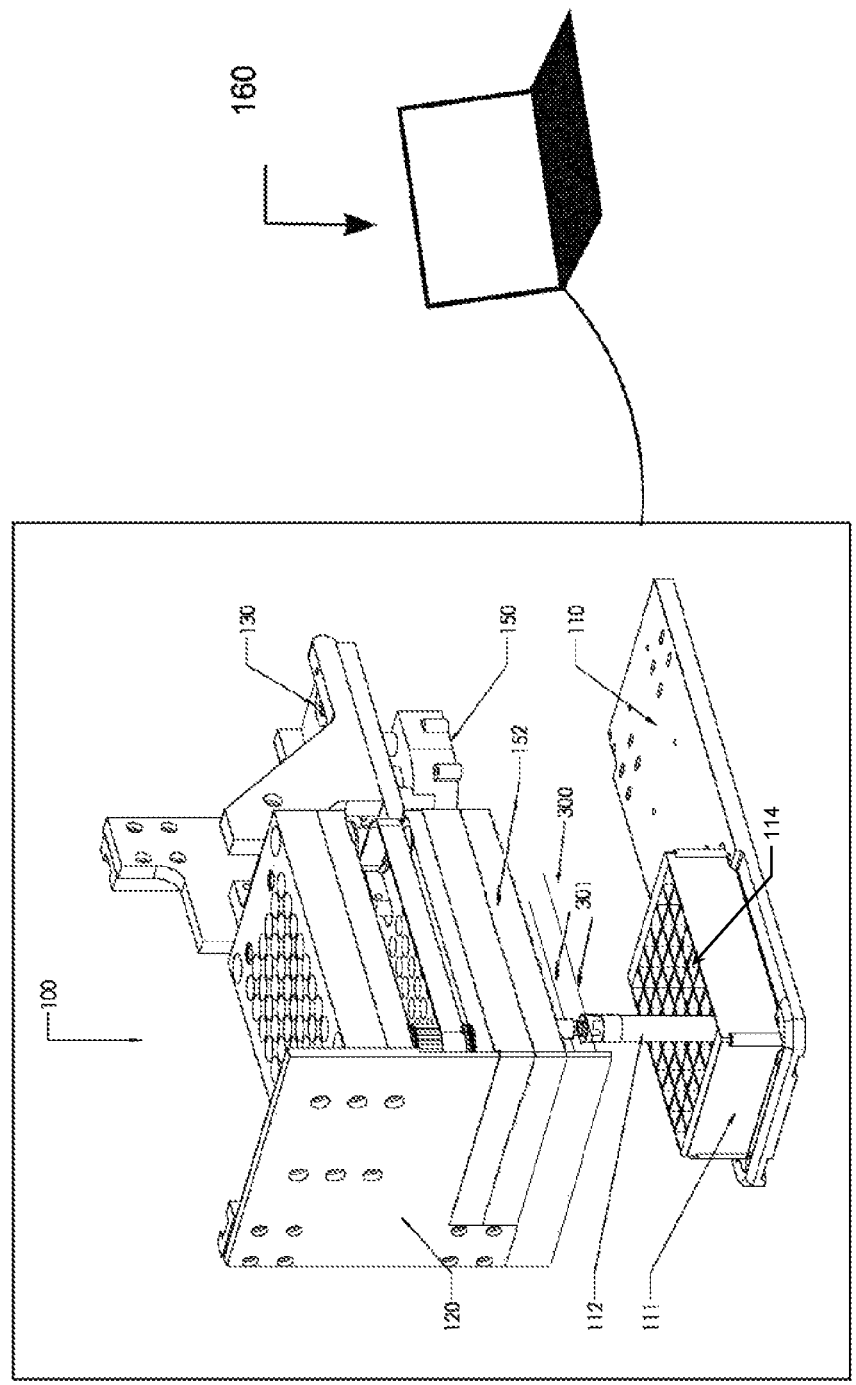
FIG. 5 shows a schematical perspective view of yet a further embodiment of the present invention.
Figure 6:
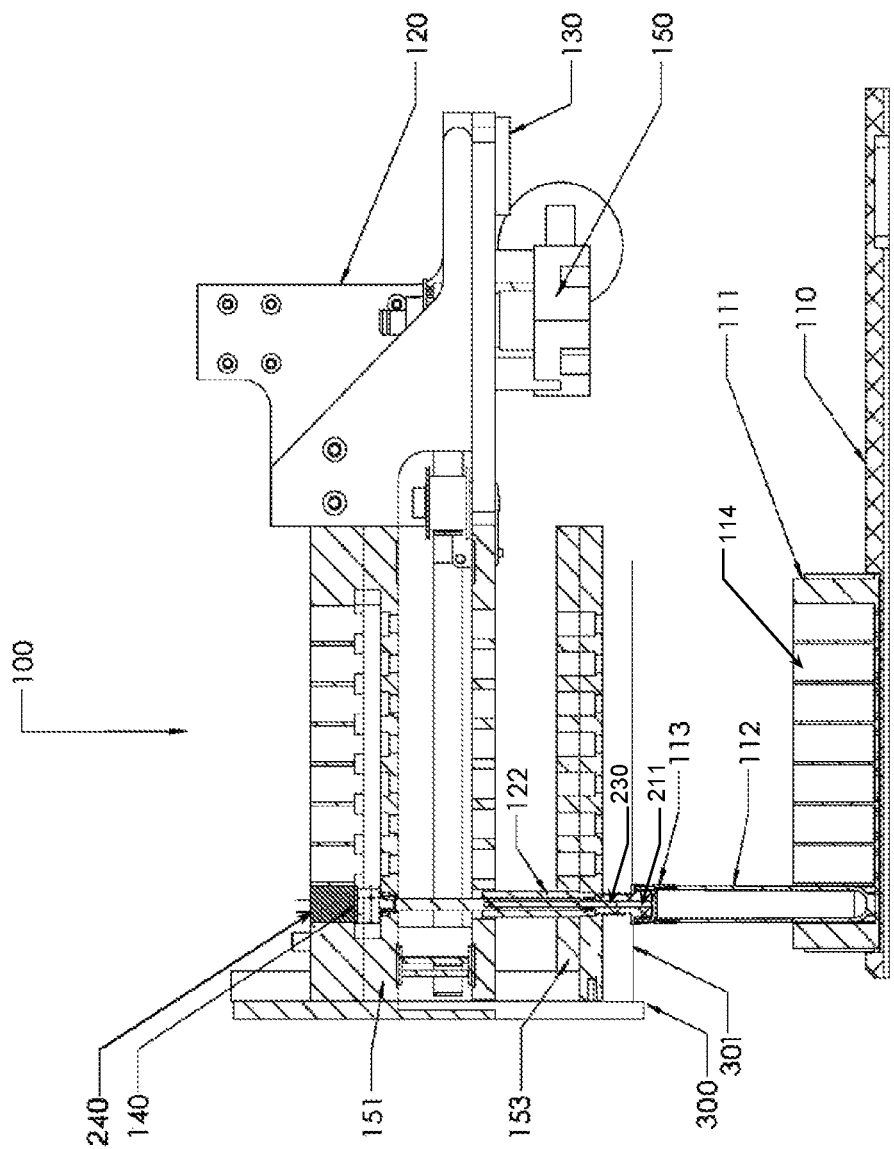
FIG. 6 shows a sectional side view of the embodiment shown in FIG. 6.

In yet another embodiment, the capping and de-capping apparatus 100 may comprise an opto-electric device such as a light curtain 300, as shown in FIGS. 5 and 6. The light curtain comprises at least one transmitter and at least one receiver. The light curtain comprises either a plurality of parallel light beams 301, as shown in FIGS. 5 and 6, or one continuous, reflected light beam being reflected back and forth across the curtain surface. The light curtain 300 is arranged between the cartridge 152 and the rack 111, and the light beam(s) extend(s) in a plane which is parallel with the planes of the cartridge and the rack. The light curtain may be used to determine the height of the tubes 112 that have been placed in the rack 111 and/or the presence of tubes 112 in a rack 111 that has been placed in the apparatus. This data can be used to set the apparatus to move to the head unit 120 and/or the first and second attachment bodies 151, 153 to the correct height for capping and de-capping, and/or to alert the user to the absence of tubes 112 in a rack 111 or that the incorrect cartridge 152 is installed in the apparatus. Further, the light curtain may be used to detect the presence of caps 113 in the socket units 123, to detect the presence or absence of caps 113 on the tubes 112 in a rack 111, or to determine if a cap 113 has fallen from a socket unit 123 or if a drop of a tube's 112 contents drips from a cap 113 during removal.

This embodiment comprises a capping and de-capping apparatus 100 for capping and de-capping tubes 112 disposed in a tube holding rack 111 having a two-dimensional array of apertures 114 for holding said tubes, the apparatus 100 comprising a rack support 110 for supporting the tube holding rack 111, a head unit 120 carrying at least one capping and de-capping gripper 122, a drive system 130 for moving the rack support 110 and the head unit 120 relatively towards and away from one another, in order to cause engagement or disengagement of the capping and de-capping gripper 122 with or from a cap 113 of at least one tube 112, and a drive system 140 for rotating the capping and de-capping gripper 122, wherein rotation in one direction causes attachment of the cap 113 to the tube and rotation in the opposite direction causes detachment of the cap 113 from the tube, and an opto-electronic device arranged between the head unit 120 and the tube holding rack 111. The opto-electronic device may comprise a light curtain. The light curtain may comprise at least one light beam extending in a plane parallel to the head unit 120 and the tube holding rack 111.

The various aspects and implementations has been described in conjunction with various embodiments herein. However, other variations to the disclosed embodiments can be understood and effected by those skilled in the art in practicing the claimed subject-matter, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage.

The reference signs used in the claims shall not be construed as limiting the scope.

The invention claimed is:

1. A capping and de-capping apparatus for capping and de-capping tubes disposed in a tube holding rack having a two-dimensional array of apertures for holding tubes, said apparatus comprising:
   a rack support for supporting said tube holding rack,
   a head unit carrying an array of ejector pins and actuators that rotate said ejector pins,
   an exchangeable cartridge comprising an array of capping and de-capping grippers, each comprising a socket to engage a cap on a tube in an aperture, the cartridge being configured to attach to and detach from the head unit from below the head unit with the sockets aligned with the apertures, the cartridge permitting exchange of an entire array of capping and de-capping grippers at once for rotation of the sockets with the ejector pins,
   a drive system for moving said rack support and said head unit relatively towards and away from one another, in order to cause engagement or disengagement of said capping and de-capping grippers with or from caps of tubes in the array of apertures, and
   a drive system including the actuators that rotate said ejector pins and capping and de-capping grippers, wherein rotation in one direction causes attachment of said cap to said tube and rotation in the opposite direction causes detachment of said cap from said tube.

2. A capping and de-capping apparatus according to claim 1, wherein said head unit comprises a first attachment body supporting the ejector pins and actuators and a second attachment body below the first attachment body, said cartridge being attached to said second attachment body.

3. A capping and de-capping apparatus according to claim 2, wherein said cartridge is attached to and detached from said second attachment body by means of automated clamping means arranged on said second attachment body.

4. A capping and de-capping apparatus according to claim 1, wherein said apparatus comprises at least one apparatus setup means comprising data informing the apparatus of which set up is needed for the tubes.

5. A capping and de-capping apparatus according to claim 4, wherein said apparatus setup means comprises a combination of switches arranged on said head unit.

6. A capping and de-capping apparatus according to claim 4, wherein said apparatus setup means comprises a microchip arranged on said cartridge.

7. A capping and de-capping apparatus according to claim 1, wherein each of said capping and de-capping grippers has a through-going passage extending along a center axis of the capping and de-capping gripper, and wherein the ejector pin is moveably arranged within said through-going passage, said ejector pin being configured to perform a translational movement relative to said capping and de-capping gripper, thereby effecting a release of a cap retained within said capping and de-capping gripper.

8. A capping and de-capping apparatus according to claim 1, comprising a plurality of capping and de-capping grippers so configured that each capping and de-capping gripper may engage and/or disengage a cap independently of the other grippers.

9. A capping and de-capping apparatus according to claim 1, wherein said apparatus further comprises a control unit configured to control the operation of said capping and de-capping grippers and/or said ejector pins independently from one another.

10. A capping and de-capping apparatus according to claim 9, further comprising a user interface associated with said control unit and configured to permit a user to decide which capping and de-capping gripper shall engage and/or disengage a tube configured to receive and/or dispose of a cap placed within said rack.

11. A method of operating a capping and de-capping apparatus according to claim 1, said method comprising the steps of:
placing a cartridge onto a rack support,
moving a head unit towards said cartridge and rack support by means of a drive system,
attaching said cartridge to said head unit,
moving said head unit and cartridge from said rack support by means of said drive system,
placing a rack onto said rack support,
moving said head unit and cartridge towards said rack and rack support by means of said drive system,
with at least one capping and de-capping gripper, attached to said cartridge, engaging an opposing cap on an opposing test tube placed in a rack on said rack support, and
disengaging said cap from said test tube by means of concerted movement of said drive system, moving said head unit away from said rack support, and a simultaneous rotational movement of said gripper unit, said rotational movement being caused by an actuator unit connected to said capping and de-capping gripper,
attaching a cap, by means of reversing the above steps, said rotational movement being stopped when a means for sensing a torque registers that a certain threshold torque is exceeded.

12. A method of operating a capping and de-capping apparatus according to claim 11, further comprising the step of:
activating apparatus setup means, thereby effecting an apparatus setup tailored to the specific capping and de-capping grippers of said cartridge.

13. A method of operating a capping and de-capping apparatus according to claim 12, wherein activating comprises said cartridge interacting with a combination of switches arranged on said head unit.

14. A method of operating a capping and de-capping apparatus according to claim 12, wherein activating comprises a microchip arranged on said cartridge interacting with a control unit of said apparatus.

15. A method of operating a capping and de-capping apparatus according to claim 11, further comprising detaching said cartridge from said head unit by means of the steps of:
moving said head unit and cartridge towards said rack support by means of a drive system such that said cartridge rests upon said rack support,
detaching said cartridge from said head unit,
moving said head unit from said cartridge and said rack support by means of said drive system.

16. A method of operating a capping and de-capping apparatus according to claim 15, wherein said cartridge is attached to and detached from said head unit by means of automated clamping means.

17. A method of operating a capping and de-capping apparatus according to claim 11, wherein a cap in contact with a capping and de-capping gripper, but not undergoing a rotation by the actuator unit connected to such a capping and de-capping gripper, is not removed from a respective test tube.

18. A method of operating a capping and de-capping apparatus according to claim 11, further comprising the steps of:
releasing a capped tube from a capping and de-capping gripper by moving a first attachment body towards said rack support such that an ejector pin comes into contact with the cap of said tube,
disengaging said socket unit from said cap by moving a second attachment body away from said tube, whereby said ejector pin remains in contact with said cap while said socket unit is disengaged from said cap,
moving said first attachment body from said rack support, thereby releasing said tube and freeing said capping and de-capping apparatus to perform a new cycle of capping and de-capping.

19. A method of operating a capping and de-capping apparatus according to claim 18, wherein said first and second attachment bodies are moved by means of a drive system.

* * * * *